United States Patent [19]
Cline

[11] 4,229,053
[45] Oct. 21, 1980

[54] TRACK GUIDE ASSEMBLY
[75] Inventor: Lawrence R. Cline, Oswego, Ill.
[73] Assignee: Caterpillar Tractor Co., Peoria, Ill.
[21] Appl. No.: 881,268
[22] Filed: Feb. 27, 1978
[51] Int. Cl.³ .......................................... B62D 55/14
[52] U.S. Cl. ...................................... 305/28; 305/12
[58] Field of Search ...................... 305/56, 28, 27, 12, 305/16, 17

[56] References Cited
U.S. PATENT DOCUMENTS

| | | | |
|---|---|---|---|
| 1,318,188 | 10/1919 | Tritton | 305/28 |
| 2,049,693 | 8/1936 | Eberhard | 305/12 |
| 2,418,610 | 4/1947 | Webb | 305/12 X |
| 4,006,940 | 2/1977 | Halterman | 305/28 X |
| 4,082,371 | 4/1978 | Werner et al. | 305/56 |

*Primary Examiner*—David A. Scherbel
*Attorney, Agent, or Firm*—Phillips, Moore, Weissenberger, Lempio & Majestic

[57] ABSTRACT

Relates to segmented track guide sections as an integral part of a track roller frame. The track guide sections are a plurality of bars located adjacent and generally parallel to the opposite sides of an endless track and are removably secured to the track roller frame. This allows replacement of individual bars as they wear down.

12 Claims, 2 Drawing Figures

TRACK GUIDE ASSEMBLY

BACKGROUND OF THE INVENTION

1. Field of the Invention

The invention relates to a track assembly of the endless track type wherein an endless track passes over a plurality of rollers and an idler and is driven by a sprocket. More specifically, the invention relates to a provision of segmented guide means supported by a track roller frame to allow for individual replacement thereof.

2. Prior Art

Track assemblies which comprise an endless track passing over a plurality of rollers and an idler and driven by a sprocket are well known in the art. Further, it is well known to make use of track roller frames having a generally U-shaped-cross-section defined by a pair of parallel rails and a joining bridge. It is also known to make use of guide bars or the like to retain the endless track so that it does not slip off of the sprocket, the idler or the rollers. However, in the prior art structures, when the guide bar has become worn it has been necessary to replace the entire guide bar. Further, removal of track rollers has generally required complete removal of the track roller frame. Still further, relatively complex structure has been needed to mount the guide bar. All of these are disadvantageous in requiring added time of assembly, repair, replacement and the like.

SUMMARY OF THE INVENTION

The present invention is directed to overcoming one or more problems as set forth above.

According to the present invention there is provided an improvement in a track assembly which comprises an endless track passing over a plurality of roller means and an idler and driven by sprocket means. The improvement comprises a track roller frame having a generally U-shaped cross-section defined by a pair of substantially parallel rails and a joining bridge, the frame being supported adjacent opposite ends thereof adjacent the sprocket means and the idler and being positioned generally above the roller means. A plurality of bars are located adjacent and generally parallel to the opposite sides of the endless track to provide a guide for the movement thereof. Further, means are provided for removably securing the bars to the track roller frame.

BRIEF DESCRIPTION OF THE DRAWING

The invention will be better understood by reference to the figures of the drawing wherein like numbers denote like parts throughout and wherein.

DETAILED DESCRIPTION OF THE PREFERRED EMBODIMENT

Figure 1:
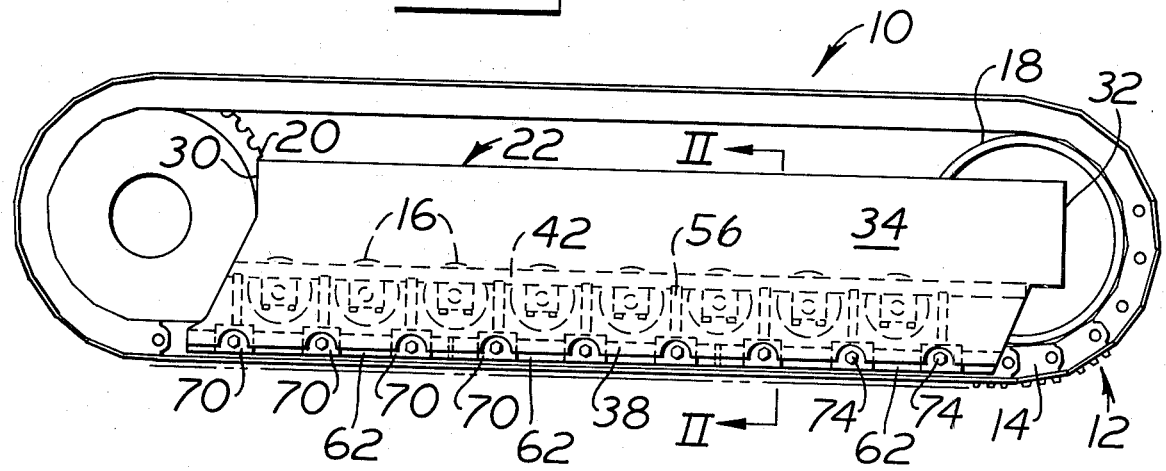
FIG. 1 illustrates in side view a track assembly in accordance with the present invention.

Adverting to FIG. 1, there is illustrated therein a track assembly 10. The track assembly 10 comprises an endless track or belt 12 formed from a plurality of segments 14 in a usual manner. The endless track 12 passes over a plurality of rollers 16 and over an idler 18. The endless track 12 is driven by a sprocket 20 in a conventional manner.

Figure 2:
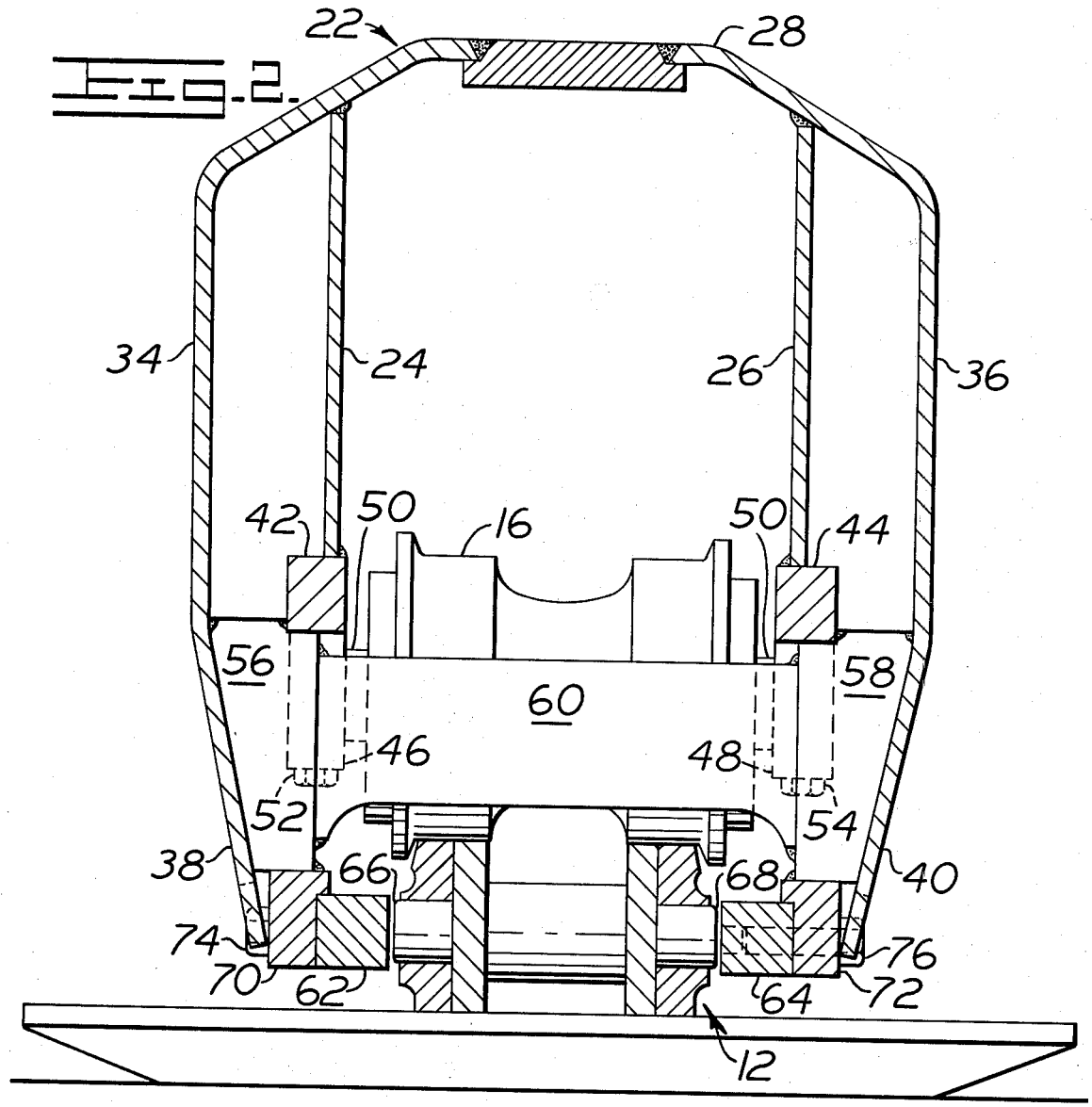
FIG. 2 illustrates an enlarged view taken along line II—II of FIG. 1.

A track roller frame 22 shown most clearly in FIG. 2 forms an important part of the present invention. The track roller frame 22 has a generally U-shaped cross-section defined by a pair of parallel rails 24 and 26 and a joining bridge 28. The track roller frame 22 is supported adjacent opposite ends 30 and 32 thereof (see FIG. 1) adjacent the sprocket 20 and the idler 18 and is further positioned generally above the rollers 16 as will be seen most clearly from FIG. 2.

A pair of side panels 34 and 36 are made integral with the track roller frame 22 and are spaced laterally outwardly from the parallel rails 24 and 26 respectively. The side panels 34 and 36 each extend downwardly to a respective lower portion 38 and 40 adjacent the endless track 12.

Adjacent the bottoms of the respective parallel rails 24 and 26 there are fastened respective rods 42 and 44 which extend generally the length of the track roller frame 22. The respective rods 42 and 44 serve to support the rollers 16 therebetween. Briefly, each of the rollers 16 is removably secured between the rods 42 and 44 by respective brackets 46 and 48 which hold a dead shaft 50 and are removable through removing respective bolts 52 and 54. The bolts 52 and 54, as will be seen, thus serve to fasten the respective brackets 46 and 48 to the respective rods 42 and 44. Thus, the brackets 46 and 48 and the bolts 52 and 54 serve as means for removably securing the rollers 16 to the rods 42 and 44 and thus to the rails 24 and 26 respectively.

Respective gussets 56 and 58 serve to brace each respective side panel 34 and 36 to a respective rail 24 and 26. More particularly, the gussets 56 and 58, respectively, serve to fasten the side rails 34 and 36, respectively, to the rods 42 and 44, respectively. The gussets 56 and 58 thus provide added rigidity to the overall structure. Further, a tie bar 60 is provided between the parallel rails 24 and 26 to provide a bracing therebetween. Preferably the gussets 56 and 58 and the tie bar 60 are co-planar whereby the overall bracing obtained is quite rigid.

In accordance with the present invention a plurality of guide bars 62 and 64 are provided and located adjacent and generally parallel to the respective opposite sides 66 and 68 of the endless track 12 to provide a guide for the movement thereof. Means are also provided for individually removably securing the bars 62 and 64 to the track roller frame 22. The bar removable securing means, in the embodiment illustrated, comprises a plurality of mounting blocks 70 and 72 spaced between and adjacent rollers 16 and spaced outwardly from and adjacent the respective opposite sides 66 and 68 of the endless track 12. The mounting blocks 70 and 72 are supported by the track roller frame 22 and by a plurality of bolts 74 and 76, respectively. The bolts 74 and 76, respectively, pass through the respective blocks 70 and 72 and fasten into the respective bars 62 and 64. Reference to FIGS. 1 and 2 will make it clear that the respective bolts 74 and 76 removably secure the bars 62 and 64 to more than one of the blocks 70 and 72. In the particular embodiment illustrated in FIG. 1 each of the bars 62 is shown as being removably secured to three of the blocks 70 by the bolts 74.

It will be noted that in the preferred embodiment of the present invention as illustrated most clearly in FIG. 2, each of the respective mounting blocks 70 and 72 is supported by a respective one of the gussets 56 and 58 thus providing an extremely rigid structure. It will further be noted that, since the blocks 70 and 72 are located intermediate the respective rollers 16, each of the rollers 16 can be easily removed without the necessity of removing anything other than the respective bolts 74 and 76, the respective bars 62 and 64, the respective bolts 52 and 54 and the respective brackets 46 and 48. This allows the respective rollers 16 to be removed downwardly out of the track roller frame 22. Further, it will be noted that the individual bars 62 and 64 can be replaced as they wear without the necessity of replacing all of the bars 62 and 64 at the same time. It is clear that this will require relatively little down time since only a few of the respective bolts 74 and 76 will need to be removed.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art in which the invention pertains and as may be applied to the essential features hereinbefore set forth and as fall within the scope of the invention and the limits of the appended claims.

The embodiments of the invention in which an exclusive property or privilege is claimed are defined as follows:

1. In a track frame assembly which comprises an endless track passing over a plurality of roller means and an idler and being driven by sprocket means, an improvement comprising:
   a track roller frame having a generally U-shaped cross-section defined by a pair of parallel rails and a joining bridge, said frame being supported adjacent opposite ends thereof adjacent said sprocket means and said idler and being positioned generally above said roller means;
   a pair of side panels integral with said track roller frame and spaced laterally outwardly from said parallel rails, said side panels each extending downwardly to respective lower portions thereof at a level defined by said endless track;
   a plurality of bars located adjacent and generally parallel to the opposite sides of said endless track to provide a guide for the movement thereof; and
   means for removably securing said bars to said track roller frame.

2. An improvement as in claim 1, including:
   means removably securing said rollers to said rails.

3. An improvement as in claim 1, wherein said bar removable securing means comprises a plurality of mounting blocks spaced between said rollers and between said endless track and track roller frame and a plurality of bolt means removably securing at least one of said bars to more than one of said blocks.

4. An improvement as in claim 3, including:
   means removably securing said rollers to said rails.

5. An improvement as in claim 1, including:
   tie bar means providing bracing between said parallel rails.

6. An improvement as in claim 1, including:
   gusset means bracing each respective side panel to a respective rail.

7. An improvement as in claim 6, wherein said bar removable securing means comprises a plurality of mounting blocks spaced between said rollers and between said endless track and supported by said gusset means and a plurality of bolt means removably securing at least one of said bars to more than one of said blocks.

8. An improvement as in claim 7, including:
   means removably securing said rollers to said rails.

9. An improvement as in claim 7, including:
   tie bar means providing bracing between said parallel rails.

10. An improvement as in claim 9, including:
    means removably securing said rollers to said rails.

11. An improvement as in claim 9, wherein said gusset means and said tie bar means are generally coplanar.

12. An improvement as in claim 11, including:
    means removably securing said rollers to said rails.

* * * * *